US011828845B2

(12) United States Patent
Kurosawa

(10) Patent No.: US 11,828,845 B2
(45) Date of Patent: Nov. 28, 2023

(54) OBSTACLE DETECTION DEVICE AND OBSTACLE DETECTION METHOD

(71) Applicant: Faurecia Clarion Electronics Co., Ltd., Saitama (JP)

(72) Inventor: Daiki Kurosawa, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 32 days.

(21) Appl. No.: 17/588,774

(22) Filed: Jan. 31, 2022

(65) Prior Publication Data

US 2022/0252723 A1    Aug. 11, 2022

(30) Foreign Application Priority Data

Feb. 5, 2021    (JP) .................................. 2021-017786

(51) Int. Cl.
| | |
|---|---|
| *G01S 15/931* | (2020.01) |
| *G01S 15/10* | (2006.01) |
| *B60W 30/09* | (2012.01) |
| *B60W 30/06* | (2006.01) |

(52) U.S. Cl.
CPC ........... *G01S 15/931* (2013.01); *B60W 30/06* (2013.01); *B60W 30/09* (2013.01); *G01S 15/101* (2013.01); *B60W 2420/54* (2013.01); *B60W 2520/06* (2013.01); *B60W 2540/18* (2013.01); *G01S 2015/932* (2013.01)

(58) Field of Classification Search
CPC ............. G01S 15/931; G01S 2015/932; G01S 15/101; B60W 30/09; B60W 2420/54; B60W 2520/06; B60W 2540/18
See application file for complete search history.

(56) References Cited

U.S. PATENT DOCUMENTS

2021/0214001 A1*    7/2021    Solomon ................ B62D 7/159

FOREIGN PATENT DOCUMENTS

| FR | 2961465 A1 | 12/2011 |
|---|---|---|
| GB | 2481324 A | 12/2011 |
| JP | 2010-018167 A | 1/2010 |
| JP | 2010018167 A * | 1/2010 |

(Continued)

OTHER PUBLICATIONS

The French Office Action mailed by French Patent Office dated on Aug. 1, 2023 in corresponding French patent application No. 2200956.

*Primary Examiner* — Isam A Alsomiri
*Assistant Examiner* — Abdallah Abulaban
(74) *Attorney, Agent, or Firm* — IP BUSINESS SOLUTIONS, LLC

(57) ABSTRACT

An obstacle detection device includes a traveling direction determination unit configured to determine a traveling direction of an own vehicle based on acquired steering angle information and shift position information, and an obstacle determination unit configured to set a detection range as a predetermined range around the own vehicle, determines, when an object detected based on sensor data is positioned inside the detection range, the object as an obstacle that obstructs traveling of the own vehicle, and outputs a control signal for stopping the traveling of the own vehicle or decelerating the own vehicle. The obstacle determination unit changes the detection range based on a determination result of the traveling direction determination unit.

6 Claims, 12 Drawing Sheets

(56) References Cited

FOREIGN PATENT DOCUMENTS

| JP | 2014-094725 A | 5/2014 | |
| JP | 2019-028486 A | 2/2019 | |
| WO | WO-2015028864 A1 * | 3/2015 | ................ B60T 7/22 |

* cited by examiner

BACKWARD LEFT TURNING

OBSTACLE DETECTION DEVICE AND OBSTACLE DETECTION METHOD

INCORPORATION BY REFERENCE

The present application claims priority under 35 U.S.C. § 119 to Japanese Patent Application No. 2021-017786 filed on Feb. 5, 2021. The content of the application is incorporated herein by reference in its entirety.

BACKGROUND OF THE INVENTION

Field of the Invention

The present invention relates to an obstacle detection device and an obstacle detection method.

Description of the Related Art

Conventionally, a device has been known that detects an object existing around a vehicle and determines whether or not the detected object is an obstacle that obstructs a vehicle traveling along a parking path.

For example, a parking support device disclosed in Japanese Patent Laid-Open No. 2010-18167 sets a predetermined range around a vehicle as an original area, and detects an obstacle area where an obstacle exists in the set original area. When support is started, the parking support device sets an area excluding at least the obstacle area from the original area as a support area and determines whether or not the vehicle has approached an outer peripheral end portion of the support area while guiding movement of the vehicle. The parking support device emits a warning of which a driver is notified when it is determined that the vehicle has approached the outer peripheral end portion of the support area and when the vehicle has approached an end portion of the support area, i.e., when there is a risk of collision between the vehicle and the obstacle.

SUMMARY OF THE INVENTION

However, when setting of an obstacle area and a support area is not appropriate, erroneous determination occurs in determination of contact between a vehicle and an obstacle, and a brake is erroneously operated so that traveling of the vehicle may be stopped. In this case, a path is recalculated, thereby presenting a problem that it takes time until the vehicle is parked at a target parking position.

The present invention is directed to preventing an obstacle from being erroneously determined in a vehicle area where there is little risk of contact and collision and preventing a brake from being erroneously operated.

To attain the above-described object, an obstacle detection device according to an aspect of the present invention includes an input interface connected to an external device, a manipulation information acquisition unit configured to acquire steering angle information of a vehicle and shift position information of a shift device via the input interface, a detection information acquisition unit configured to acquire detection information of an object existing around the vehicle via the input interface, a traveling direction determination unit configured to determine a traveling direction of the vehicle based on the steering angle information and the shift position information, and an obstacle determination unit configured to set a detection range as a predetermined range around the vehicle, determines, when an object detected based on the detection information is positioned inside the detection range, the object as an obstacle that obstructs traveling of the vehicle, and outputs a control signal for stopping the traveling of the vehicle or decelerating the vehicle, in which the obstacle determination unit changes the detection range based on a determination result of the traveling direction determination unit.

The aspect of the present invention makes it possible to prevent an obstacle from being erroneously determined in a vehicle area where there is little risk of contact and collision and prevent a brake from being erroneously operated.

DETAILED DESCRIPTION OF THE PREFERRED EMBODIMENT

An embodiment of the present invention will be described below with reference to the accompanying drawings.

Figure 1:
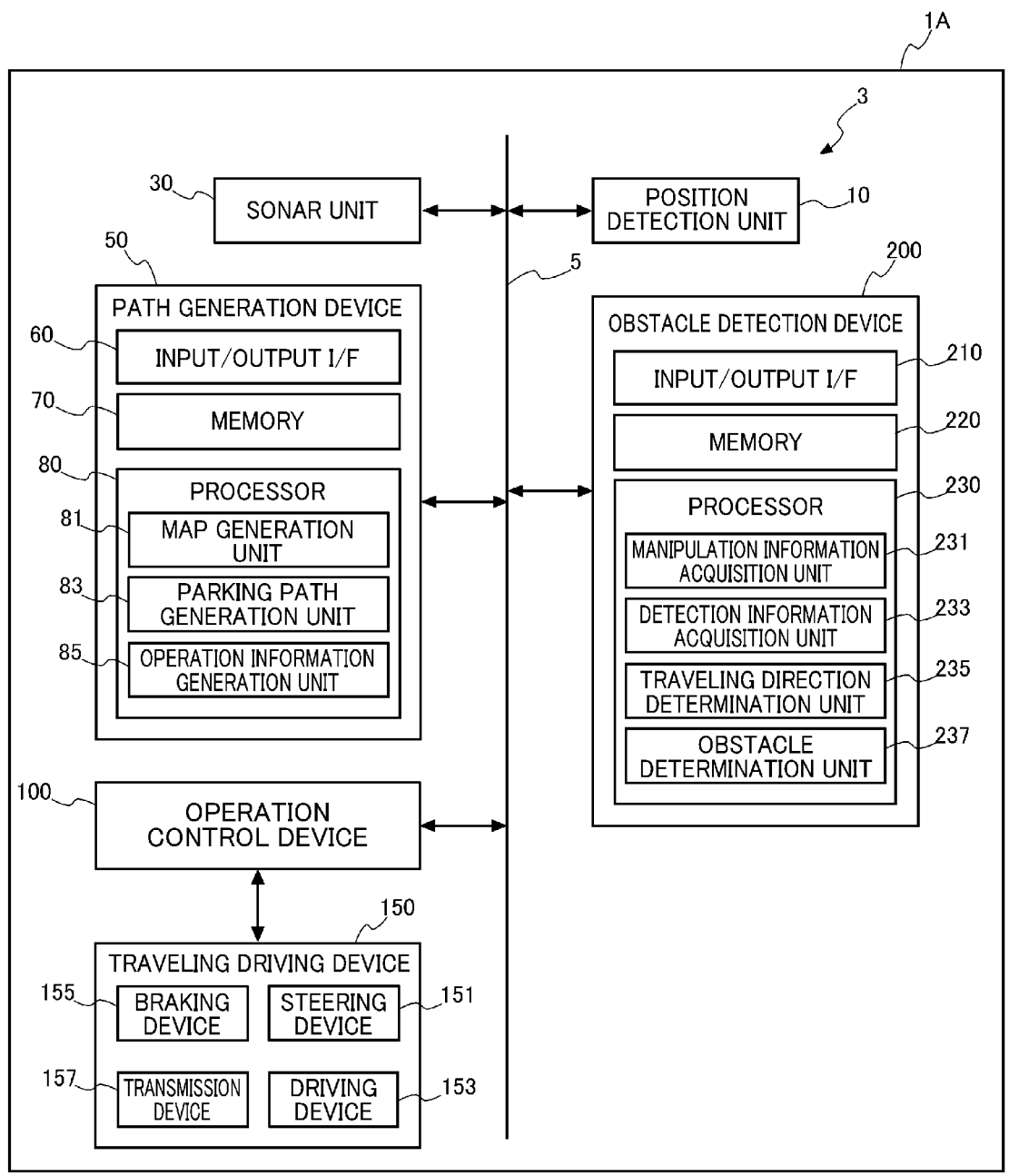
FIG. 1 is a block diagram illustrating a configuration of an in-vehicle apparatus.

FIG. 1 is a diagram illustrating a configuration of an in-vehicle apparatus 3 mounted on a vehicle. In the following description, the vehicle having the in-vehicle apparatus 3 mounted thereon is referred to as an own vehicle 1A, and a vehicle other than the own vehicle 1A is referred to as another vehicle 1B.

The in-vehicle apparatus 3 includes a position detection unit 10, a sonar unit 30, a path generation device 50, an operation control device 100, a traveling driving device 150, and an obstacle detection device 200. The position detection unit 10, the sonar unit 30, the path generation device 50, the operation control device 100, and the obstacle detection device 200 are connected to be data communicable with one another via a communication bus 5. The communication bus 5 is a bus for data communication according to a standard such as Ethernet (registered trademark), a CAN (controller area network), or an LIN (local interconnect network).

The position detection unit 10 detects a position of the own vehicle 1A. The position detection unit 10 includes a GNSS (global navigation satellite system) receiver and a processor. Illustration of the GNSS receiving unit and the processor is omitted. The GNSS receiver receives a signal to be transmitted from a satellite. The processor operates a longitude and a latitude as position information of the own vehicle 1A based on the signal received by the GNSS receiver and an orientation of the own vehicle 1A due to a difference in calculated position information. The position detection unit 10 outputs the position information and the orientation information of the own vehicle 1A found by the operation to the path generation device 50 and the obstacle detection device 200.

The sonar unit 30 includes a plurality of sonars. The plurality of sonars are each arranged in a front, rear, and side part, for example, of the own vehicle 1A, to detect an object existing around the own vehicle 1A. Specifically, each of the sonars detects a distance to the object and an orientation based on the own vehicle 1A, for example, using an ultrasonic wave. The sonar unit 30 outputs sensor data representing a detection result to the path generation device 50 and the obstacle detection device 200.

Figure 2:
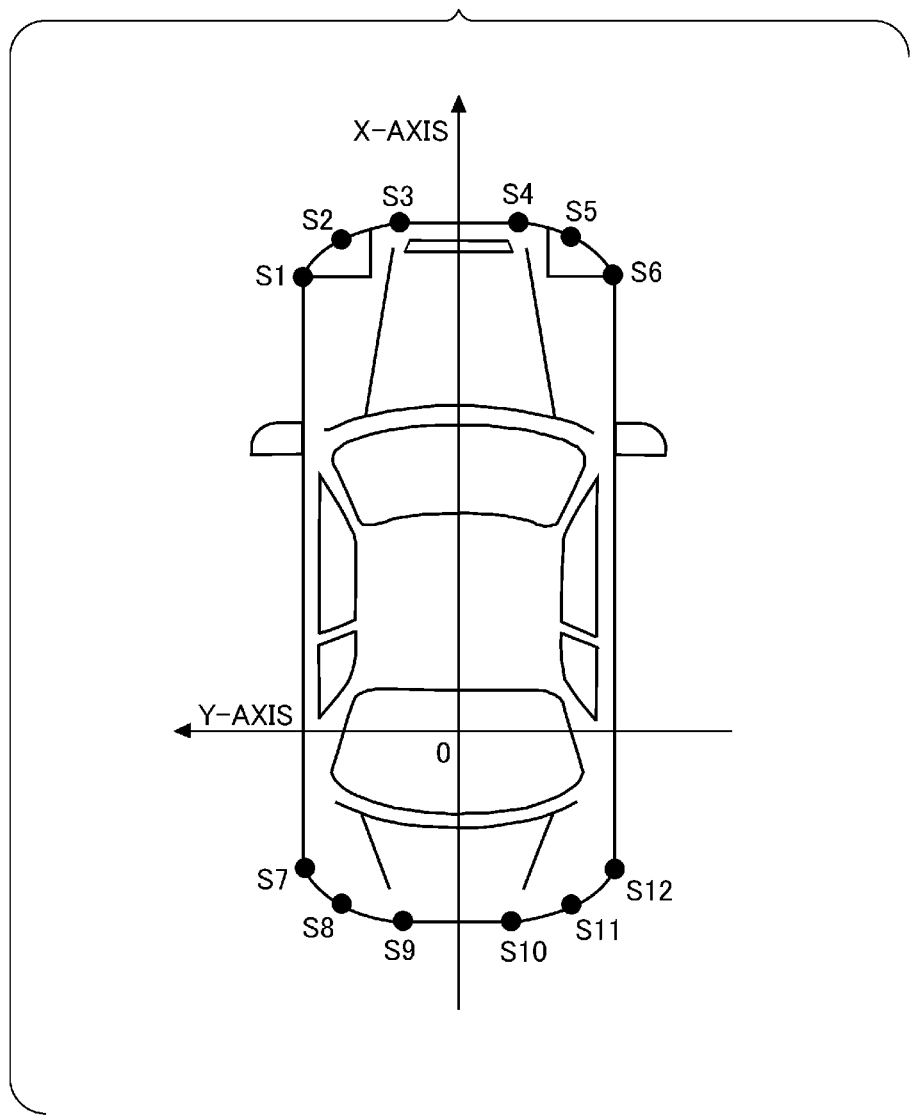
FIG. 2 is a diagram illustrating an installation position of a sonar.

FIG. 2 is a diagram illustrating a sonar installation position.

Although a case where 12 sonars are mounted on the own vehicle 1A will be described in the present embodiment, the number of mounted sonars is not limited to 12.

Six sonars, i.e., a sonar S1, a sonar S2, a sonar S3, a sonar S4, a sonar S5, and a sonar S6 are installed on the front side of the own vehicle 1A, as illustrated in FIG. 2.

The sonar S1, the sonar S2, and the sonar S3 are installed on the front left side of the own vehicle 1A, and the sonar S4, the sonar S5, and the sonar S6 are installed on the front right side of the own vehicle 1A.

A sonar S7, a sonar S8, and a sonar S9 are installed on the rear left side of the own vehicle 1A, and a sonar S10, a sonar S11, and a sonar S12 are installed on the rear right side of the own vehicle 1A.

An example of respective installation positions of the sonar S1 to the sonar S12 will be described.

To describe the respective installation positions of the sonar S1 to the sonar S12, two-dimensional coordinates are set in the own vehicle 1A. In the two-dimensional coordinates, a direction parallel to a vehicle length direction of the own vehicle 1A is set as an X-axis, and a direction parallel to a vehicle width direction of the own vehicle 1A is set as a Y-axis. A positive direction of the X-axis is a forward traveling direction of the own vehicle 1A, and a negative direction of the X-axis is a backward traveling direction of the own vehicle 1A. A positive direction of the Y-axis is a leftward direction of the own vehicle 1A, and a negative direction of the Y-axis is a rightward direction of the own vehicle 1A. The origin of the two-dimensional coordinates is set at a position on a rear wheel axle of the own vehicle 1A and at the center in the vehicle width direction.

The sonar S1 is installed at an installation angle of 95° at a position of coordinates (2800, 850).

The sonar S2 is installed at an installation angle of 50° at a position of coordinates (3100, 700).

The sonar S3 is installed at an installation angle of 15° at a position of coordinates (3300, 250).

The sonar S4 is installed at an installation angle of 345° at a position of coordinates (3300, −250).

The sonar S5 is installed at an installation angle of 310° at a position of coordinates (3100, −700).

The sonar S6 is installed at an installation angle of 265° at a position of coordinates (2800, −850).

The sonar S7 is installed at an installation angle of 95° at a position of coordinates (−400, 850).

The sonar S8 is installed at an installation angle of 160° at a position of coordinates (−650, 700).

The sonar S9 is installed at an installation angle of 195° at a position of coordinates (−850, 250).

The sonar S10 is installed at an installation angle of 165° at a position of coordinates (−850, −250).

The sonar S11 is installed at an installation angle of 200° at a position of coordinates (−650, −700).

The sonar S12 is installed at an installation angle of 265° at a position of coordinates (−400, −850).

A unit of a coordinate value is mm, and an installation angle is a counterclockwise angle with the positive direction of the X-axis as 0°.

Although a case where the in-vehicle apparatus 3 includes a sonar will be described in the present embodiment, a sensor mountable on the in-vehicle apparatus 3 is not limited to the sonar. For example, a radar and a lidar (LIDAR: laser imaging detection and ranging) capable of measuring a distance from an object using a radio wave, light, or the like may be mounted on the in-vehicle apparatus 3. A camera may be mounted on the in-vehicle apparatus 3.

The path generation device 50 is a computer device including an input/output interface (the interface is hereinafter abbreviated as I/F) 60 (CAN transceiver, transceiver, Ethernet PHY), a memory 70, and a processor 80 (first processor). The path generation device 50 may be configured to include a storage device such as an HDD (hard disk drive) or an SSD (solid state drive), for example, in addition to the devices.

The input/output I/F 60 is connected to the communication bus 5, and performs data communication with an external device connected to the communication bus 5. The external device includes the position detection unit 10, the sonar unit 30, the operation control device 100, and the obstacle detection device 200.

The memory 70 includes a ROM (read only memory) and a RAM (random access memory). The memory 70 may include a nonvolatile semiconductor memory such as a flash memory. The memory 70 stores a computer program to be executed by the processor 80, data to be processed when the processor 80 executes the computer program, and data representing a processing result. The memory 70 stores sensor data to be outputted from the sonar unit 30 and position information and orientation information detected by the position detection unit 10. The memory 70 stores a peripheral map generated by the path generation device 50 and information about a parking path.

The processor 80 includes a CPU (central processing unit) and an MPU (microprocessor unit).

The path generation device 50 includes a map generation unit 81, a parking path generation unit 83, and an operation information generation unit 85, respectively, as functional components. Each of the functional components is a function to be implemented when the processor 80 performs an operation according to the computer program.

The map generation unit 81 generates a peripheral map representing a situation around the own vehicle 1A based on the position information and the orientation information and the sensor data read out from the memory 70. In the peripheral map, a position of the own vehicle 1A, a position of an object existing around the own vehicle 1A and a distance to the object, and a position of a parking frame such as a white line painted on a road surface of a parking lot, for example, are recorded. The object to be recorded on the peripheral map includes another vehicle 1B and structures such as a pillar and a wall of the parking lot, for example. The object is hereinafter referred to as a target object. The parking frame is painted on the road surface in a predetermined thickness, whereby a spacing corresponding to the thickness of the white line is detected as a periodical feature.

The parking path generation unit 83 refers to the peripheral map generated by the map generation unit 81, to determine a parking frame in which the own vehicle 1A is to be parked. For example, the parking path generation unit 83 selects a parking frame in which a target object is not detected and a distance from the own vehicle 1A is a previously set distance or less from among parking frames recorded on the peripheral map. The parking path generation unit 83 sets a position and an angle at which the own vehicle 1A is to be parked within the selected parking frame, to determine a parking position.

Then, the parking path generation unit 83 generates a parking path for parking the own vehicle 1A at the determined parking position. The parking path is a path for moving the own vehicle 1A to the parking position from the position of the own vehicle 1A. The position of the own vehicle 1A is a position represented by the position information read out from the memory 70. Known means is used to perform processing for generating the parking path.

The operation information generation unit 85 receives information about the parking path generated by the parking path generation unit 83. The operation information generation unit 85 generates operation information as information for causing the operation control device 100 to control the traveling driving device 150 based on the received information about the parking path. Examples of the operation information include information about a manipulation amount of a manipulation target such as a steering wheel, a shift device, an accelerator, or a brake and a position where the manipulation target is to be manipulated. Examples of the manipulation amount include a steering angle of a steering wheel, an accelerator opening, a manipulation amount of a brake. A manipulation position is information about a position on the parking path for manipulating the manipulation target in a manipulation amount corresponding to the manipulation position. The operation information generation unit 85 outputs control information including path information as the information about the parking path and the generated operation information to the operation control device 100 and the obstacle detection device 200.

The operation control device 100 is a computer device including an input/output I/F, a memory, and a processor. Illustration of the input/output I/F, the memory, and the processor is omitted.

The operation control device 100 receives control information from the path generation device 50. The operation control device 100 generates a driving signal based on operation information included in the received control information. The driving signal is a signal for driving a steering device 151, a driving device 153, a braking device 155, and a transmission device 157 provided in the traveling driving device 150. The operation control device 100 outputs the generated driving signal to the traveling driving device 150.

The operation control device 100 receives a stop signal from the obstacle detection device 200. The stop signal is a signal for stopping traveling of the own vehicle 1A traveling along the parking path. The operation control device 100 stops driving the driving device 153 and drives the braking device 155 to stop traveling the own vehicle 1A when receiving the stop signal.

The traveling driving device 150 includes the steering device 151, the driving device 153, the braking device 155, and the transmission device 157.

The steering device 151 is a device including an actuator that steers a steering wheel of the own vehicle 1A. The operation control device 100 drives the actuator in response to the driving signal, and steers the steering wheel.

The driving device 153 is a device including an actuator that adjusts a driving force of the driving wheel of the own vehicle 1A. When a power source of the own vehicle 1A is an engine, a throttle actuator corresponds to the actuator. When the power source is a motor, the motor corresponds to the actuator. The operation control device 100 drives the actuator in response to the driving signal, and adjusts the driving force of the driving wheel of the own vehicle 1A.

The braking device 155 is a device including an actuator that controls a brake system provided in the own vehicle 1A and controls a braking force to be applied to the wheel of the own vehicle 1A.

The operation control device 100 drives the actuator in response to the driving signal, and controls the braking force to be applied to the wheel of the own vehicle 1A.

The transmission device 157 is a device including a transmission and an actuator. The transmission device 157 includes a shift device that can be manipulated by a driver to manipulate the transmission. The operation control device 100 drives the actuator in response to the driving signal, and switches a speed change ratio of the transmission and forward traveling and reverse traveling of the own vehicle 1A.

The obstacle detection device 200 is a computer device including an input/output I/F 210 (CAN transceiver, transceiver, Ethernet PHY), a memory 220, and a processor 230 (second processor). The obstacle detection device 200 may be configured to include a storage device such as an HDD or an SSD, for example, in addition to the devices.

The input/output I/F 210 is connected to the communication bus 5, and performs data communication with an external device connected to the communication bus 5. The external device includes the position detection unit 10, the sonar unit 30, the path generation device 50, and the operation control device 100. The input/output I/F 210 corresponds to an input interface.

The memory 220 includes a ROM (read only memory) and a RAM (random access memory). The memory 220 may include a nonvolatile semiconductor memory such as a flash memory. The memory 220 stores a computer program to be executed by the processor 230, data to be processed when the processor 230 executes the computer program, and data representing a processing result. The memory 220 stores the sensor data to be outputted from the sonar unit 30 and the position information and the orientation information detected by the position detection unit 10. Further, the memory 220 stores the control information received from the path generation device 50.

The processor 230 includes a CPU and an MPU.

The obstacle detection device 200 includes a manipulation information acquisition unit 231, a detection information acquisition unit 233, a traveling direction determination unit 235, and an obstacle determination unit 237, respectively, as functional components. Each of the functional components is a function to be implemented when the processor 230 performs an operation according to the computer program.

The manipulation information acquisition unit 231 acquires steering angle information and shift position information. Specifically, the manipulation information acquisition unit 231 first reads out operation information from the memory 220, and sets a determination point for each predetermined distance on the parking path represented by the path information. The manipulation information acquisition unit 231 also sets, when a point at which a traveling direction of the own vehicle 1A is changed from a forward traveling direction to a backward traveling direction or a backward traveling direction to a forward traveling direction is included in the parking path, the point as a determination point.

The manipulation information acquisition unit 231 acquires, when setting the determination point, steering angle information representing a manipulation amount of a steering wheel at the set determination point and shift position information representing a shift position of a shift device at the determination point from the operation information. The manipulation information acquisition unit 231 outputs the steering angle information and the shift position information at each of the determination points to the traveling direction determination unit 235.

The detection information acquisition unit 233 acquires the sensor data from the sonar unit 30 as detection information. The detection information acquisition unit 233 reads out the sensor data from the memory 220, and outputs the read sensor data to the obstacle determination unit 237.

The traveling direction determination unit 235 receives the steering angle information and the shift position information at each of the determination points from the manipulation information acquisition unit 231. The traveling direction determination unit 235 determines the traveling direction of the own vehicle 1A at each of the determination points based on the receive shift position information and steering angle information. The traveling direction determination unit 235 outputs information representing the determined traveling direction of the own vehicle 1A at each of the determination points to the obstacle determination unit 237.

The traveling direction to be determined by the traveling direction determination unit 235 includes four directions, i.e., a forward traveling direction, a backward straight traveling direction, a backward right turning direction, and a backward left turning direction. Although the forward traveling direction includes three directions, i.e., a straight traveling direction, a forward right turning direction, and a forward left turning direction, the traveling direction determination unit 235 determines the three traveling directions as a forward traveling direction without being distinguished.

For example, the traveling direction determination unit 235 determines the traveling direction of the own vehicle 1A as a forward traveling direction when the shift position information of the shift device is driving.

The traveling direction determination unit 235 compares a steering angle represented by the steering angle information with a first threshold value and a second threshold value when the shift position information of the shift device is backward traveling. In the present embodiment, the first threshold value is set to −120°, and the second threshold value is set to 120°.

The traveling direction determination unit 235 determines the traveling direction of the own vehicle 1A as a backward left turning direction when the shift position information is backward traveling and the steering angle is less than −120°. The traveling direction determination unit 235 determines the traveling direction of the own vehicle 1A as a backward right turning direction when the shift position information is backward traveling and the steering angle is more than 120°.

In the present embodiment, description is made assuming that a case where the steering wheel is rotated to the right as forward rotation.

Although a case where the first threshold value is set to −120° and the second threshold value is set to 120° will be described in the present embodiment, the first threshold value is not limited to −120° and the second threshold value is not limited to 120°. The first threshold value is preferably set within a range of not more than −120° nor less than −180°, and the second threshold value is preferably set within a range of not less than 120° nor more than 180°. Each of the first threshold value and the second threshold value does not have constraints on an upper limit or a lower limit, and can be set to match a steering angle characteristic, a turning characteristic, a shape, and the like of the own vehicle 1A.

The obstacle determination unit 237 receives information about a traveling direction of the own vehicle 1A at each of the determination points from the traveling direction determination unit 235 and receives sensor data from the detection information acquisition unit 233.

The obstacle determination unit 237 determines whether or not a target object detected based on the sensor data is an obstacle that obstructs traveling of the own vehicle 1A. Obstruction of the traveling of the own vehicle 1A means that the target object contacts or collides with the own vehicle 1A when the own vehicle 1A is traveled along the parking path. The obstacle determination unit 237 sets a detection range 300 as a predetermined range around the own vehicle 1A, and determines whether the target object detected by the sonar unit 30 is positioned inside or outside the detection range 300. The obstacle determination unit 237 determines, when detecting the target object positioned inside the detection range 300, the target object as an obstacle.

The obstacle determination unit 237 changes the detection range 300 based on the traveling direction of the own vehicle 1A determined by the traveling direction determination unit 235. The obstacle determination unit 237 makes the detection range 300 in a direction not corresponding to the traveling direction smaller than the detection range 300 in a direction corresponding to the traveling direction of the own vehicle 1A using a determination result of the traveling direction determination unit 235.

Specifically, the obstacle determination unit 237 determines a range of the own vehicle 1A that does not obstruct determination of contact or collision with the target object even if the detection range 300 is narrowed. That is, the obstacle determination unit 237 determines a range of the own vehicle 1A having high safety. The obstacle determination unit 237 changes the width of the detection range 300 corresponding to the determined range of the own vehicle 1A to be narrow. A relationship between the traveling direction of the own vehicle 1A and the width of the detection range 300 will be described with reference to FIGS. 3 to 7.

Figure 3:
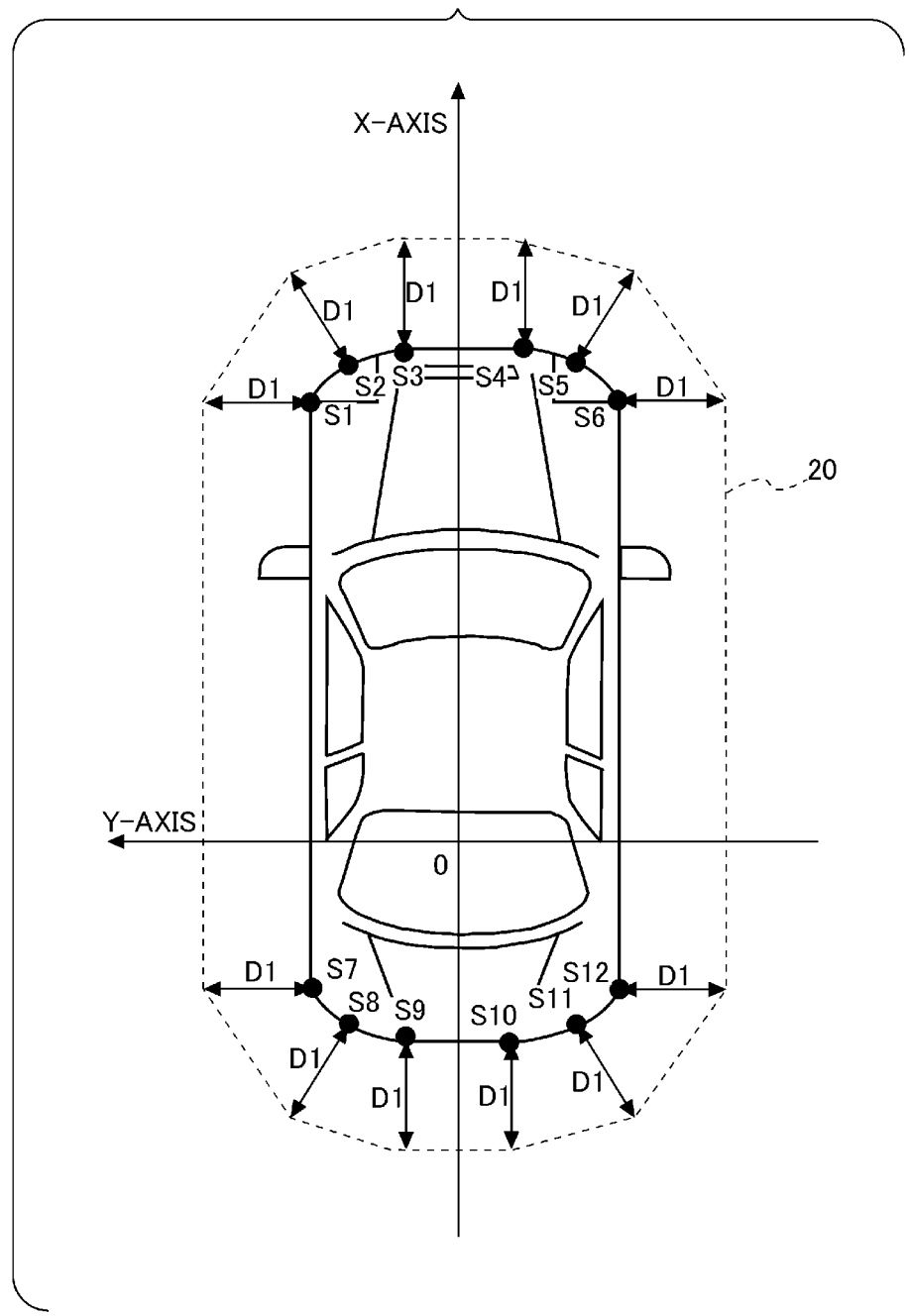
FIG. 3 is a diagram illustrating a fixed detection range as a detection range of a conventional sonar.

FIG. 3 is a diagram illustrating a fixed detection range 20 as a detection range of a conventional sonar.

The fixed detection range 20 as a conventional detection range is not changed, to always detect a target object to be an obstacle within a predetermined range even if a traveling direction of the own vehicle 1A is changed. In the fixed detection range 20, a search distance of each of sonars is uniformly set to a distance D1 for all the sonars. The search distance is a distance to be searched for by the sonar in a direction at an installation angle of the sonar. For the sonar S1, for example, the search distance is a distance at which the target object is detected in a direction of 95° as a direction at an installation angle of the sonar S1.

Figure 4:
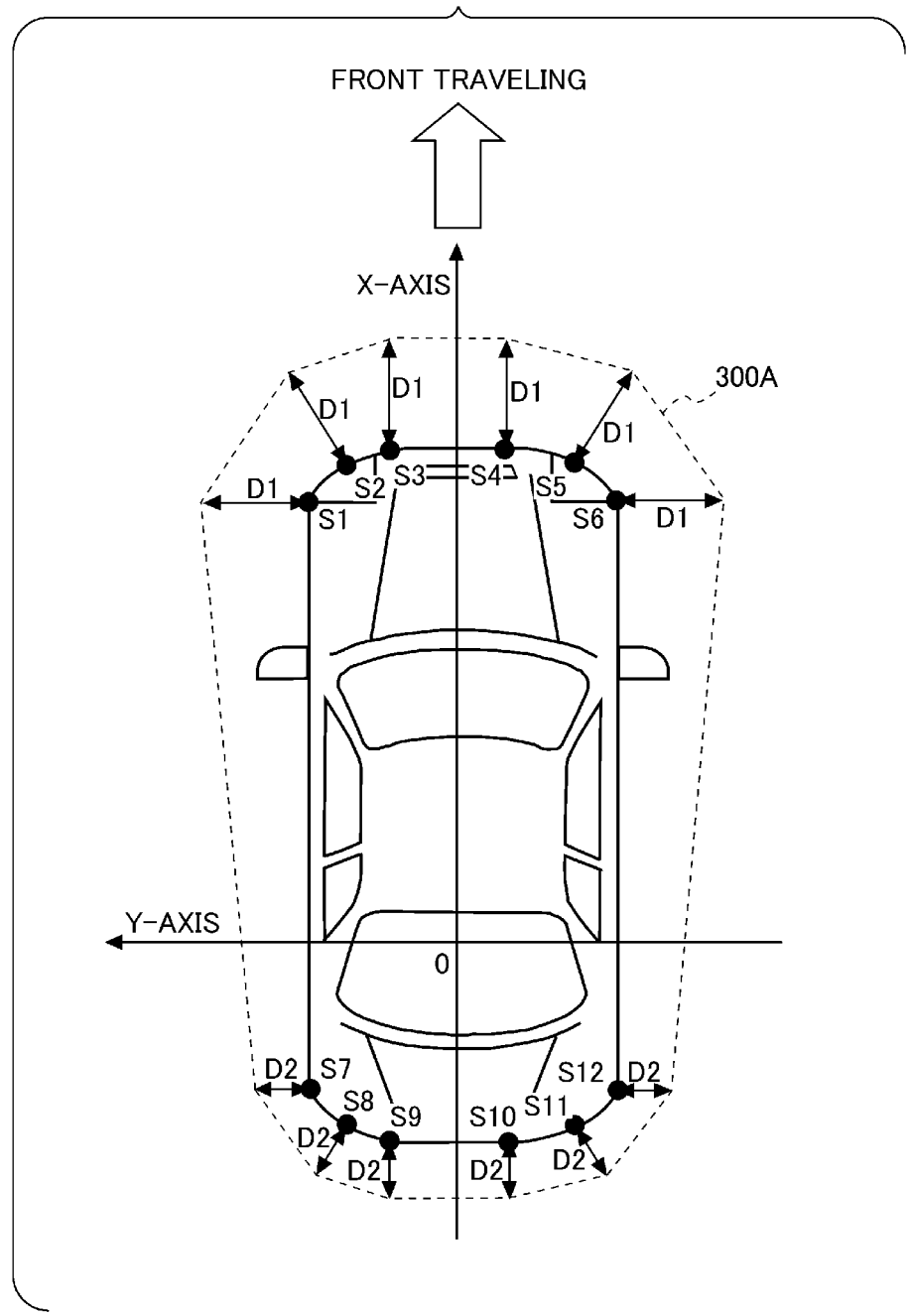
FIG. 4 is a diagram illustrating a detection range in a case where a traveling direction is a forward traveling direction.

FIG. 4 is a diagram illustrating a detection range 300A in a case where a traveling direction of the own vehicle 1A is a forward traveling direction.

The obstacle determination unit 237 sets the detection range 300A for forward traveling when the traveling direction of the own vehicle 1A is the forward traveling direction. Specifically, the obstacle determination unit 237 changes respective detection distances of the sonar S7 to the sonar S12 installed on the rear side of the own vehicle 1A from a distance D1 a distance D2. The obstacle determination unit 237 makes respective detection distances of the sonar S1 to the sonar S6 installed on the front side of the own vehicle 1A unchanged from the distance D1. The distance D2 is set to a shorter distance than the distance D1. The distance D1 corresponds to a previously set distance.

If the traveling direction of the own vehicle 1A is the forward traveling direction, the respective detection ranges 300 of the sonars S1 to S6 correspond to a range corresponding to the traveling direction of own vehicle 1A. If the traveling direction of the own vehicle 1A is the forward traveling direction, the respective detection ranges 300 of the sonars S7 to S12 correspond to a range not corresponding to the traveling direction of the own vehicle 1A.

Figure 5:
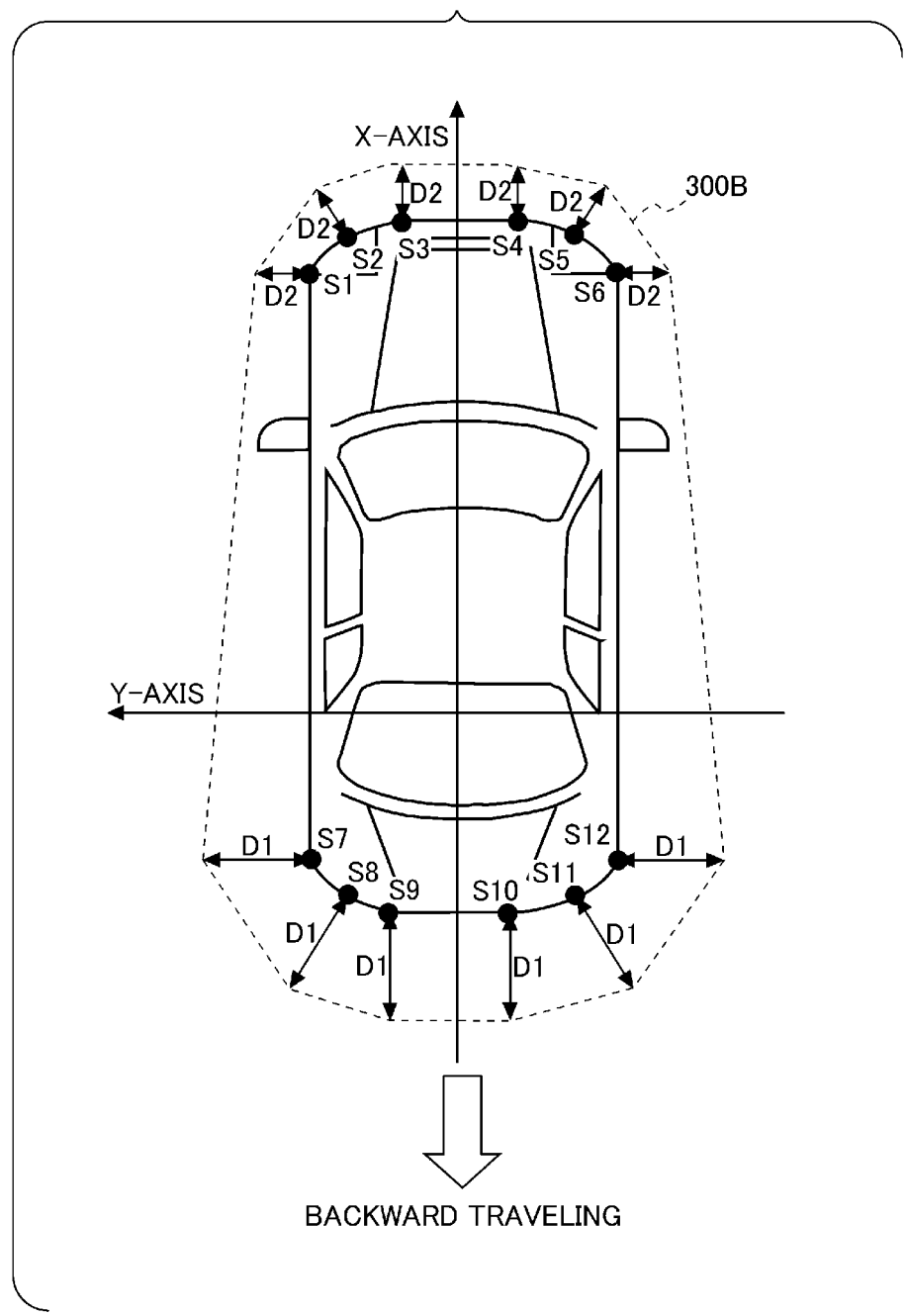
FIG. 5 is a diagram illustrating a detection range in a case where a traveling direction is a backward straight traveling direction.

FIG. 5 is a diagram illustrating a detection range 300B in a case where a traveling direction of the own vehicle 1A is a backward straight traveling direction.

The obstacle determination unit 237 sets the detection range 300B for backward traveling when the traveling direction of the own vehicle 1A is the backward straight traveling direction. Specifically, the obstacle determination unit 237 changes respective detection distances of the sonar S1 to the sonar S6 installed on the front side of the own vehicle 1A from a distance D1 to a distance D2. The obstacle determination unit 237 makes respective detection distances of the sonar S7 to the sonar S12 installed on the rear side of the own vehicle 1A unchanged from the distance D1.

If the traveling direction of the own vehicle 1A is the backward straight traveling direction, the respective detection ranges 300 of the sonars S7 to S12 correspond to a range corresponding to the traveling direction of the own vehicle 1A. If the traveling direction of the own vehicle 1A is the backward straight traveling direction, the respective detection ranges 300 of the sonars S1 to S6 correspond to a range not corresponding to the traveling direction of the own vehicle 1A.

Figure 6:
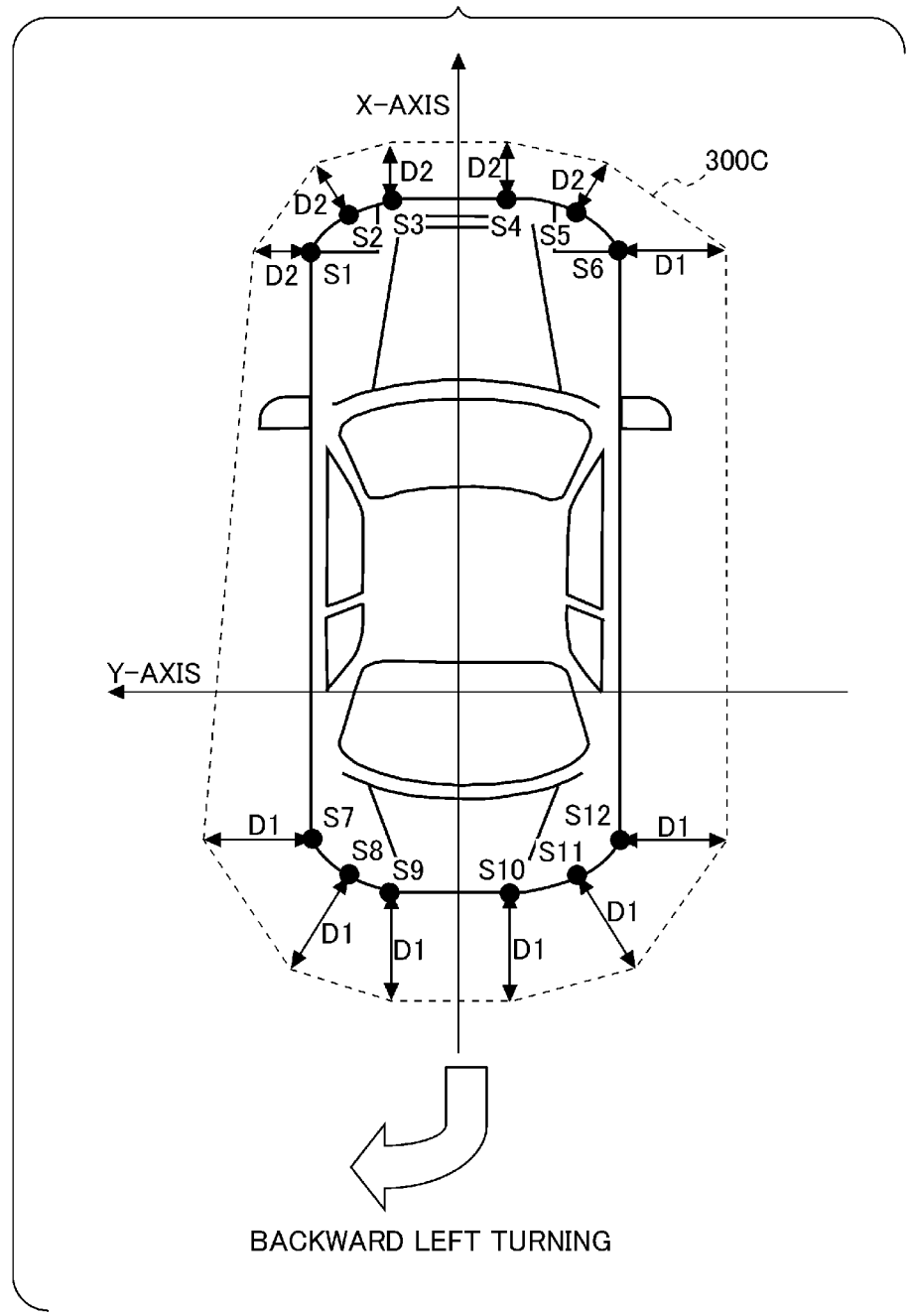
FIG. 6 is a diagram illustrating a detection range in a case where a traveling direction is a backward left turning direction.

FIG. 6 is a diagram illustrating a detection range 300C in a case where a traveling direction of the own vehicle 1A is a backward left turning direction.

The obstacle determination unit 237 sets the detection range 300C for backward left turning when the traveling direction of the own vehicle 1A is the backward left turning direction. Specifically, the obstacle determination unit 237 changes respective detection distances of the sonar S1 to the sonar S5 installed on the front side of the own vehicle 1A from a distance D1 a distance D2. The obstacle determination unit 237 makes a detection distance of the sonar S6 unchanged from the distance D1 to maintain a detection distance on the right side of the own vehicle 1A at the distance D1. The obstacle determination unit 237 makes respective detection distances of the sonar S7 to the sonar S12 installed on the rear side of the own vehicle 1A unchanged from the distance D1.

If the traveling direction of the own vehicle 1A is the backward left turning direction, the respective detection ranges 300 of the sonars S6 to S12 correspond to a range corresponding to the traveling direction of the own vehicle 1A. If the traveling direction of the own vehicle 1A is the backward left turning direction, the respective detection ranges 300 of the sonars S1 to S5 correspond to a range not corresponding to the traveling direction of the own vehicle 1A.

Figure 7:
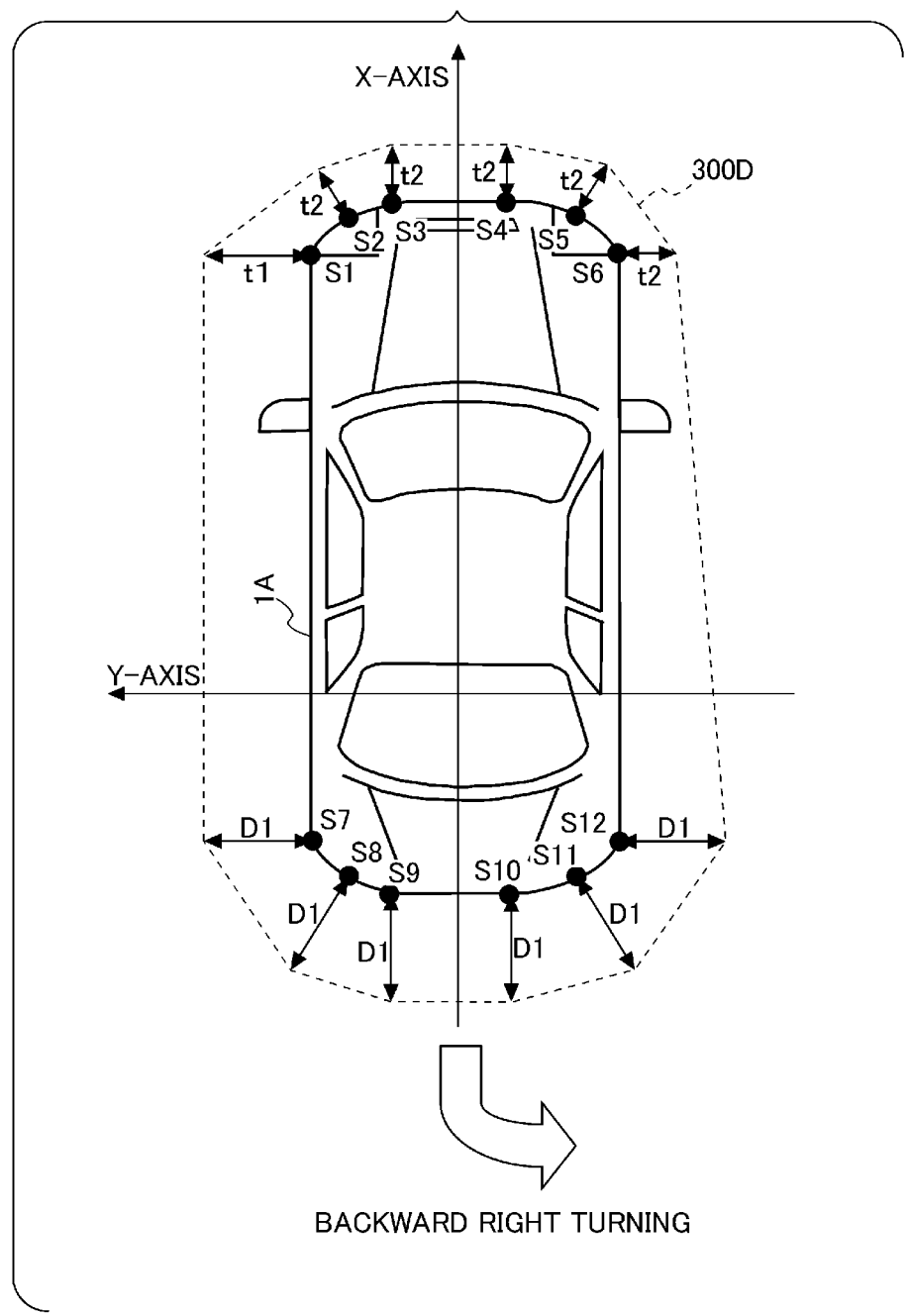
FIG. 7 is a diagram illustrating a detection range in a case where a traveling direction is a backward right turning direction.

FIG. 7 is a diagram illustrating a detection range 300D in a case where a traveling direction of the own vehicle 1A is a backward right turning direction.

The obstacle determination unit 237 sets the detection range 300D for backward right turning when the traveling direction of the own vehicle 1A is the backward right turning direction. Specifically, the obstacle determination unit 237 changes respective detection distances of the sonar S2 to the sonar S6 installed on the front side of the own vehicle 1A from a distance D1 a distance D2. The obstacle determination unit 237 makes a detection distance of the sonar S1 unchanged from the distance D1 to maintain a detection distance on the left side of the own vehicle 1A at the distance D1. The obstacle determination unit 237 makes respective detection distances of the sonar S7 to the sonar S12 installed on the rear side of the own vehicle 1A unchanged from the distance D1.

If the traveling direction of the own vehicle 1A is the backward right turning direction, the respective detection ranges 300 of the sonars S1 and S7 to S12 correspond to a range corresponding to the traveling direction of own vehicle 1A. If the traveling direction of the own vehicle 1A is the backward right turning direction, the respective detection ranges 300 of the sonars S2 to S6 correspond to a range not corresponding to the traveling direction of the own vehicle 1A.

Figure 8:
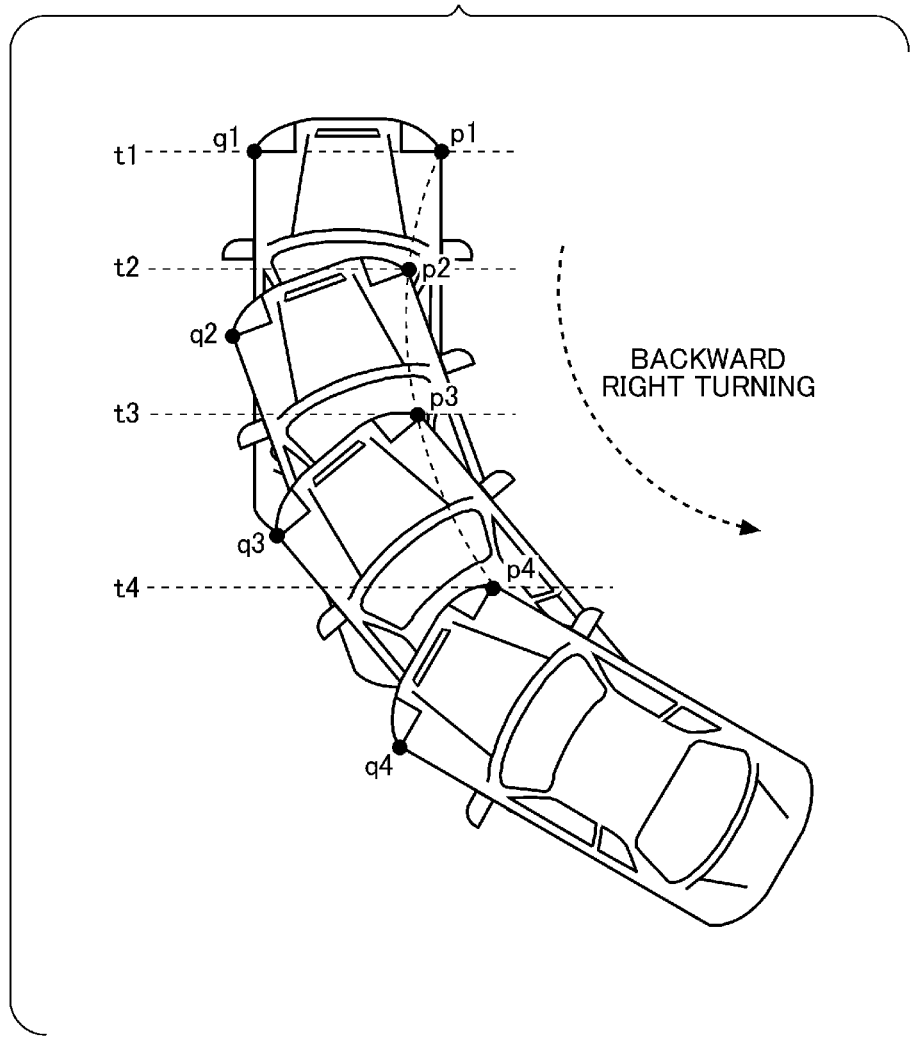
FIG. 8 is a diagram illustrating respective trajectories of a front right end portion and a front left end portion of an own vehicle in a case where the own vehicle is turned backward to the right.

FIG. 8 is a diagram illustrating respective trajectories of a front right end portion p and a front left end portion of the own vehicle 1A in a case where the own vehicle 1A is turned backward to the right.

If the own vehicle 1A is turned backward to the right, the detection distance of the sonar S6 installed in the front right end portion p of the own vehicle 1A is changed from the distance D1 to a distance D2, and the detection distance of the sonar S1 installed in the front left end portion q of the own vehicle 1A remains unchanged from the distance D1. The reason for this will be described with reference to FIG. 8.

At a time t1, the front right end portion p is positioned at p1, and the front left end portion q is positioned at q1.

At a time t2, the front right end portion p is positioned at p2, and the front left end portion q is positioned at q2.

At a time t3, the front right end portion p is positioned at p3, and the front left end portion q is positioned at q3.

At a time t4, the front right end portion p is positioned at p4, and the front left end portion q is positioned at q4.

If the own vehicle 1A is turned backward to the right, the position p2 of the front right end portion p at the time t2 moves toward the left of the position p1 of the front right end portion p at the time t1, i.e., in a direction in which the vehicle body of the own vehicle 1A has been positioned at the time t1. Similarly, the position p3 at the time t3 moves toward the left of the position p2 at the time t2, i.e., in a direction in which the vehicle body of the own vehicle 1A has been positioned at the time t2.

On the other hand, the position q2 of the front left end portion q at the time t2 moves toward the left of the position q1 of the front left end portion q at the time t1, i.e., toward the outer side of the vehicle body of the own vehicle 1A positioned at the time t1. Similarly, the position q3 at the time t3 moves toward the left of the position q2 at the time t2, i.e., toward the outer side of the vehicle body of the own vehicle 1A positioned at the time t2.

Thus, when the own vehicle 1A is turned backward to the right, the front right end portion p moves in a direction in which it is clear that a target object as an obstacle does not exist, and the front left end portion q moves in a direction in which it is not clear whether or not a target object as an obstacle exists.

Accordingly, if the own vehicle 1A is turned backward to the right, the detection distance of the sonar S6 installed in the front right end portion p of the own vehicle 1A is changed to t2, and the detection distance of the sonar S1 installed in the front left end portion q of the own vehicle 1A remains unchanged from the distance D1.

From a similar reason, if the own vehicle 1A is turned backward to the left, the detection distance of the sonar S1 installed in the front left end portion of the own vehicle 1A is changed to t2, and the detection distance of the sonar S6 installed in the front left end portion of the own vehicle 1A remains unchanged from the distance D1.

Figure 9:
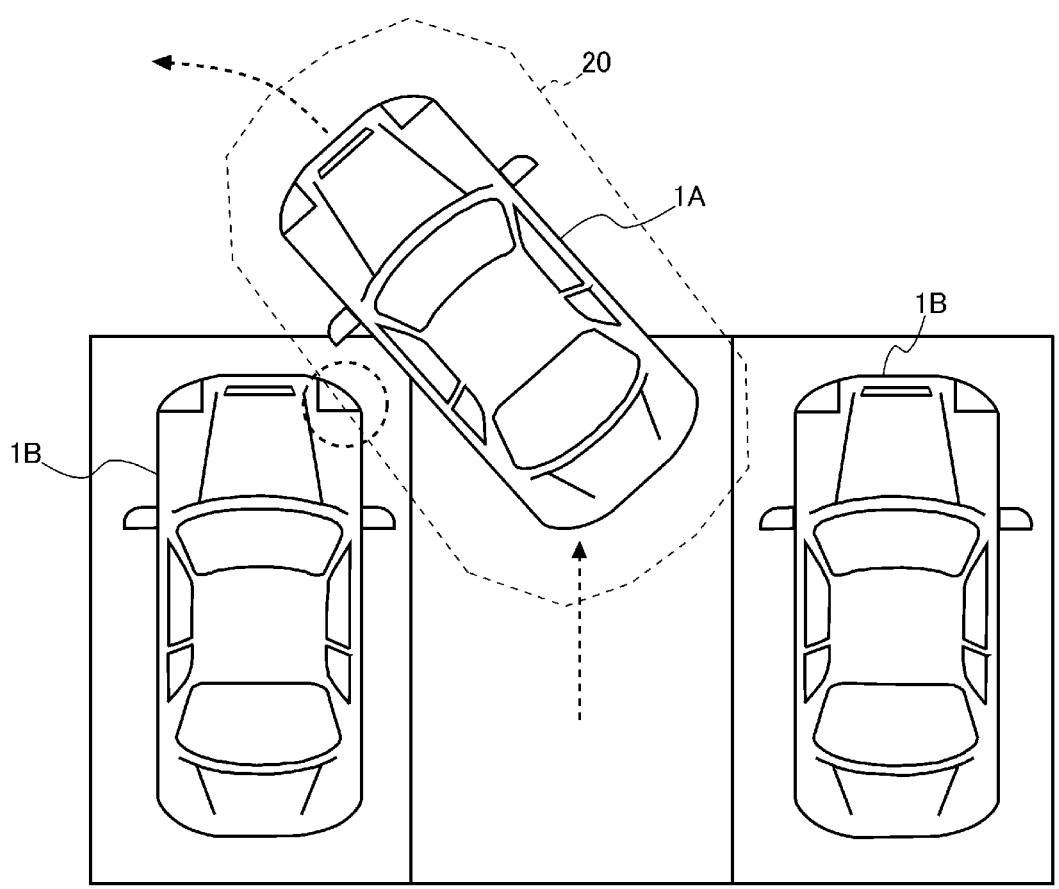
FIG. 9 is a diagram illustrating a case where an own vehicle set in a fixed detection range has been pulled out.
Figure 10:
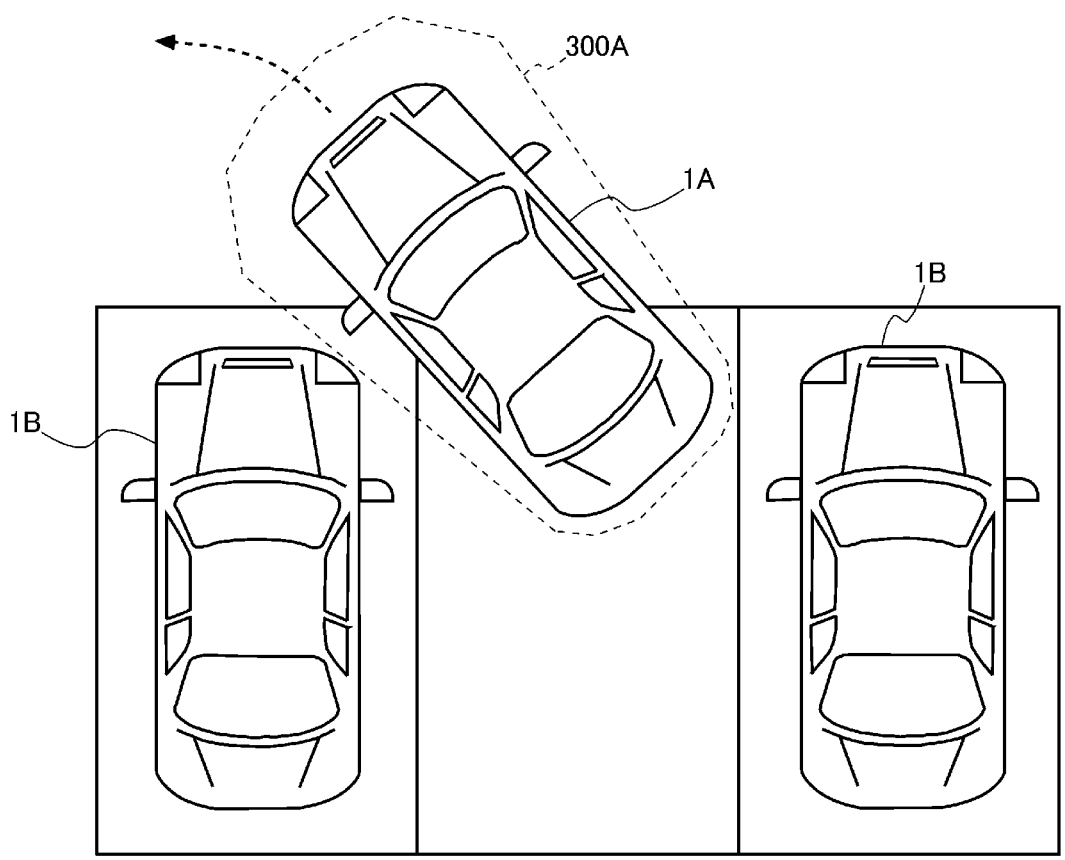
FIG. 10 is a diagram illustrating a case where an own vehicle set in a detection range corresponding to a traveling direction has been pulled out.

FIG. 9 is a diagram illustrating a case where the detection range 300 is set to a fixed detection range 20 and the own vehicle 1A is pulled out. FIG. 10 is a diagram illustrating a case where the own vehicle 1A set in the detection range 300A corresponding to a traveling direction is pulled out.

A case where the own vehicle 1A is traveled straight and then is turned to the left to pull out the own vehicle 1A from a parking position will be described.

If the detection range 300 is set to the fixed detection range 20, when a timing at which the own vehicle 1A is turned to the left is fast, another vehicle 1B parked on the left side of the own vehicle 1A, as illustrated in FIG. 9, is detected as an obstacle so that the traveling of the own vehicle 1A may be stopped.

On the other hand, if the detection range 300A for forward traveling is set, the detection distance of the sonar S7 installed in a left end portion at a rear end of the vehicle is changed from a distance D1 to a distance D2. Accordingly, the closer the own vehicle 1A comes to the rear end, the smaller the detection distance becomes. Thus, an event that the other vehicle 1B parked on the left side of the own vehicle 1A is detected as an obstacle can be prevented from occurring.

Figure 11:
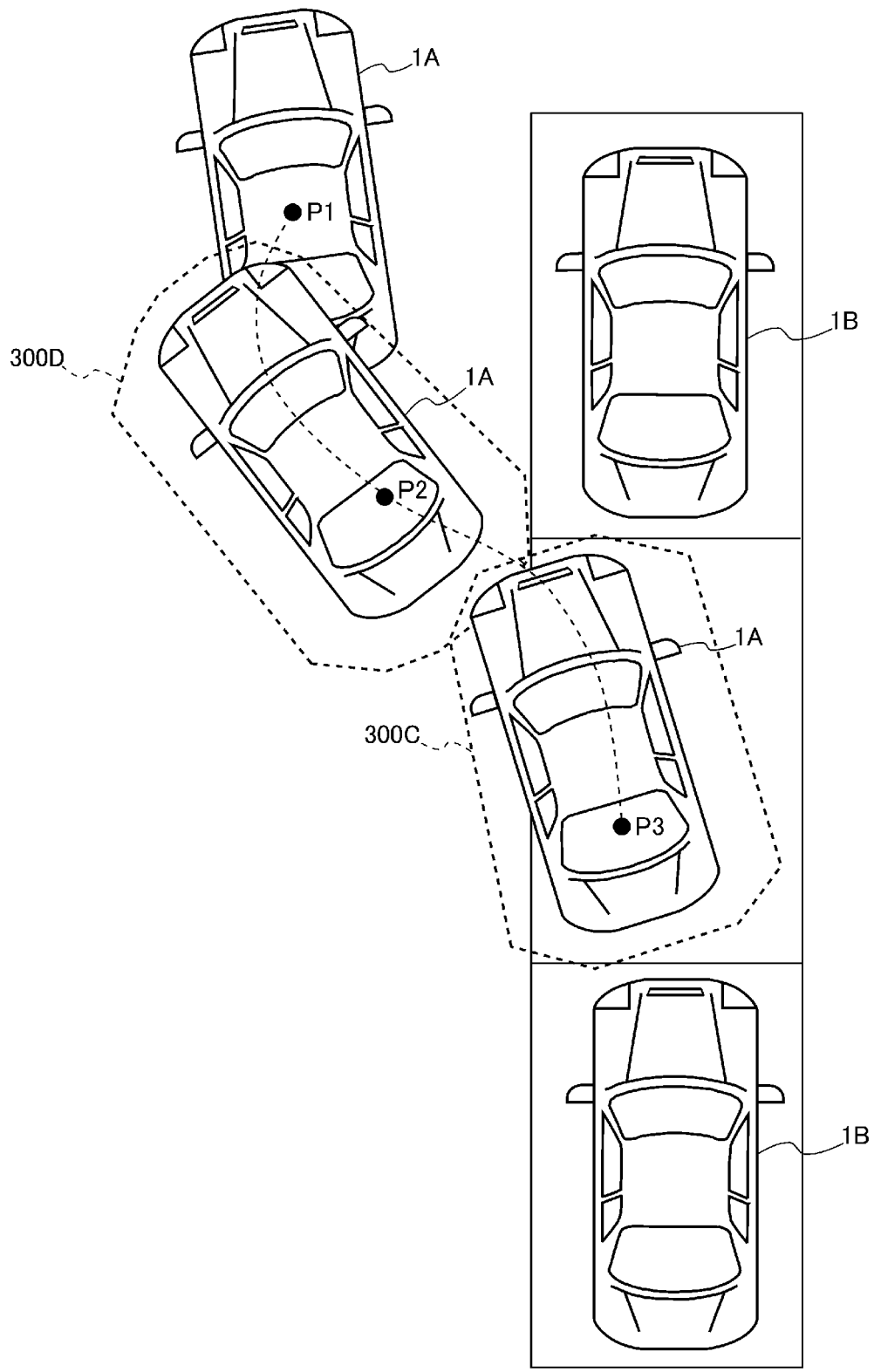
FIG. 11 is a diagram describing setting of a detection range in a case where an own vehicle is parallel parked.

FIG. 11 is a diagram for describing setting of the detection range 300 in a case where the own vehicle 1A is parallel parked.

Parallel parking is a parking manner for parking the own vehicle 1A such that the own vehicle 1A and another vehicle 1B are arranged in a vehicle length direction of the own vehicle 1A.

For the parallel parking illustrated in FIG. 11, the own vehicle 1A is turned backward to the right in a section from a position P1 to a position P2, and the own vehicle 1A is turned backward to the left in a section from the position P2 to a position P3.

In the section from the position P1 to the position P2, the detection range 300D for backward right turning is set. That is, the detection distance of the sonar S6 is changed to t2, and the detection distance in front of and on the right side of the own vehicle 1A is set short. Accordingly, in the section from the position P1 to the position P2, contact with the other vehicle 1B is prevented from being erroneously determined so that stop of the own vehicle 1A due to the erroneous determination can be prevented.

In the section from the position P2 to the position P3, the detection range 300C for backward left turning is set.

That is, the respective detection ranges 300 of the sonars S1 to S5 are changed to t2, and the detection distance in front of the own vehicle 1A is set short. Accordingly, contact with the other vehicle 1B parked in front of a parking position is prevented from being erroneously determined so that stop of the own vehicle 1A due to the erroneous determination can be prevented.

The respective detection distances of the sonar S6 and the sonar S12 are maintained at the distance D1, whereby the detection distance on the right side of the own vehicle 1A remains unchanged from the distance D1. If the right side of the parking position is a wall, for example, the detection distance on the right side of the own vehicle 1A remains unchanged from the distance D1 so that the wall can be correctly detected as an obstacle.

Figure 12:
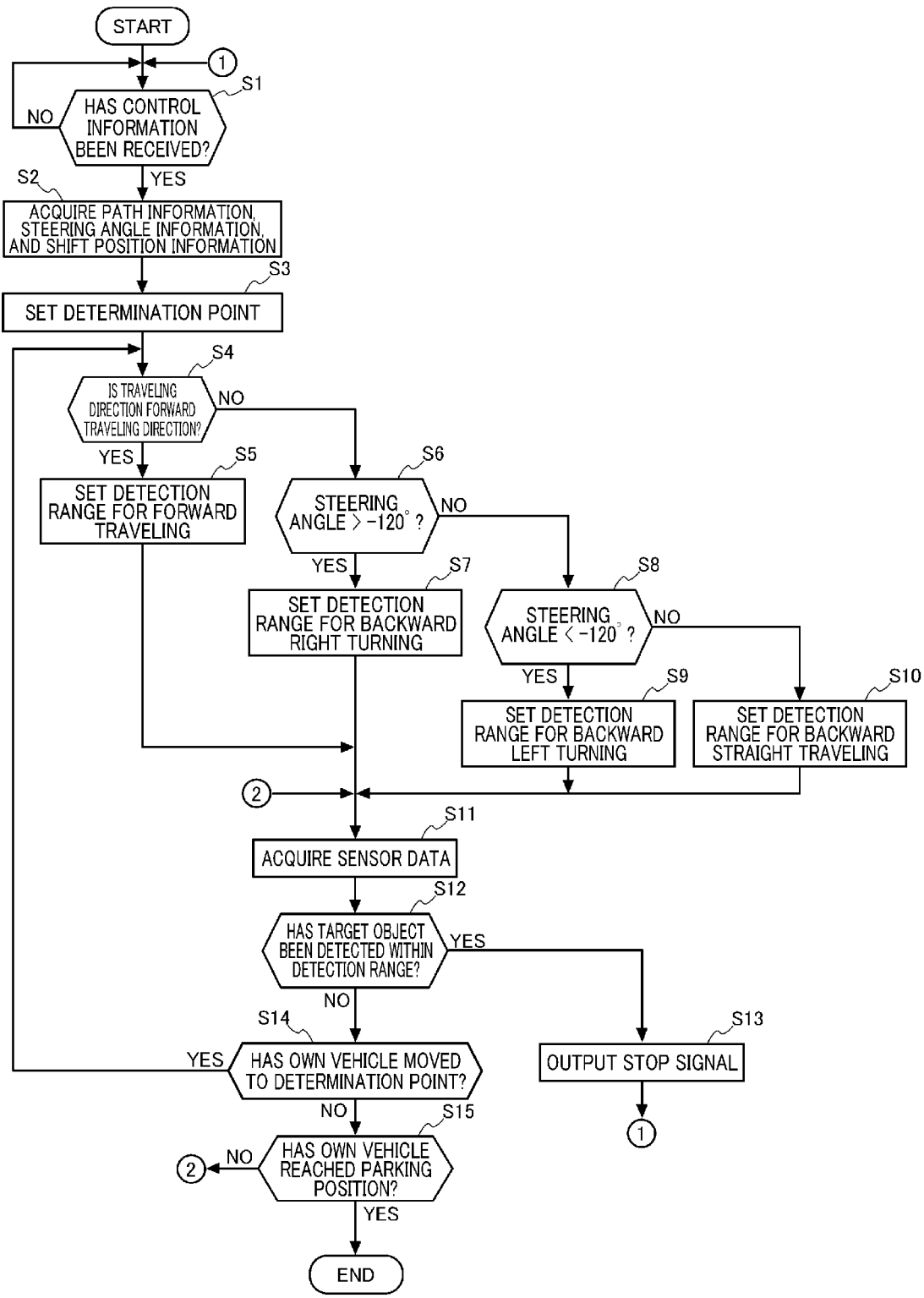
FIG. 12 is a flowchart illustrating an operation of an obstacle detection device.

FIG. 12 is a flowchart illustrating an operation of the obstacle detection device 200. The operation of the obstacle detection device 200 will be described with reference to the flowchart of FIG. 12.

First, the obstacle detection device 200 determines whether or not control information has been received from the path generation device 50 (step S1). If the control information has not been received (NO in step S1), the obstacle detection device 200 waits for start of processing until the control information has been received from the path generation device 50.

If the control information has been received (YES in step S1), the obstacle detection device 200 acquires path information, steering angle information, and shift position information included in the control information (step S2). Step S2 corresponds to an information acquisition step. Then, the obstacle detection device 200 sets a determination point for each predetermined distance on a parking path represented by the acquired path information (step S3).

Then, the obstacle detection device 200 determines whether or not a traveling direction of the own vehicle 1A is a forward traveling direction based on the steering angle information and the shift position information (step S4). Step S4 corresponds to a direction determination step. If the obstacle detection device 200 determines that the traveling direction of the own vehicle 1A is a forward traveling direction based on the steering angle information and the shift position information (YES in step S4), the obstacle detection device 200 sets a detection range 300A for forward traveling as the detection range 300 of the sonar unit 30 (step S5).

If the traveling direction of the own vehicle 1A is not a forward traveling direction (NO in step S4), the obstacle detection device 200 determines whether or not a steering angle of a steering wheel represented by the steering angle direction is more than 120° (step S6). Step S6 corresponds to a direction determination step. If the steering angle of the steering wheel is more than 120° (YES in step S6), the obstacle detection device 200 sets a detection range 300D for backward right turning as the detection range 300 of the sonar unit 30 (step S7).

If the steering angle of the steering wheel is 120° or less (NO in step S6), the obstacle detection device 200 determines whether or not the steering angle of the steering wheel is less than −120° (step S8). Step S8 corresponds to a direction determination step. If the steering angle of the steering wheel is less than −120° (YES in step S8), the obstacle detection device 200 sets a detection range 300C for backward left turning as the detection range 300 of the sonar unit 30 (step S9).

Unless the steering angle of the steering wheel is less than −120° (NO in step S8), i.e., if the steering angle of the steering wheel is not less than −120° nor more than 120°, the obstacle detection device 200 sets a detection range 300B for backward straight traveling as the detection range 300 of the sonar unit 30 (step S10).

Then, the obstacle detection device 200 acquires sensor data from the sonar unit 30 (step S11). Step S11 corresponds to a detection information acquisition step. The obstacle detection device 200 determines whether or not a position of a target object detected based on the acquired sensor data is within the detection range 300 set in any one of steps S5, S7, S9, and S10 (step S12). Step S12 corresponds to an obstacle determination step.

If the obstacle detection device 200 determines that the position of the target object is within the detection range 300 (YES in step S12), the obstacle detection device 200 determines the target object as an obstacle, and outputs a stop signal for stopping traveling of the own vehicle 1A to the operation control device 100 (step S13). Step S13 corresponds to an output step. Although a case where the obstacle detection device 200 outputs the stop signal for stopping the traveling of the own vehicle 1A to the operation control device 100 will be described in the present embodiment, the obstacle detection device 200 may output a signal for reducing a speed of the own vehicle 1A to the operation control device 100 to decelerate the own vehicle 1A.

If the obstacle detection device 200 determines that the position of the target object is outside the detection range 300 (NO in step S12), the obstacle detection device 200 determines whether or not the own vehicle 1A has moved to a subsequent determination point based on position information detected by the position detection unit 10 (step S14). If the obstacle detection device 200 determines that the own vehicle 1A has moved to a determination point (YES in step S14), the processing flow returns to step S4. In step S4, the obstacle detection device 200 sets the detection range 300 again.

If the obstacle detection device 200 determines that the position of the own vehicle 1A is not the determination point (NO in step S14), the obstacle detection device 200 determines whether or not the own vehicle 1A has reached a parking position (step S15). If the obstacle detection device 200 determines that the own vehicle 1A has reached the parking position (YES in step S15), the processing flow ends. If the obstacle detection device 200 determines that the own vehicle 1A has not reached the parking position (NO in step S15), the processing flow returns to step S14.

As described above, the obstacle detection device 200 according to the present embodiment includes the input/output I/F 210, the manipulation information acquisition unit 231, the detection information acquisition unit 233, the traveling direction determination unit 235, and the obstacle determination unit 237.

The input/output I/F 210 is connected to the sonar unit 30 and the path generation device 50, respectively, as external devices.

The manipulation information acquisition unit 231 acquires steering angle information of the own vehicle 1A and shift position information of a shift device via the input/output I/F 210.

The detection information acquisition unit 233 acquires sensor data from the sonar unit 30 as detection information of an object existing around the own vehicle 1A via the input/output I/F 210.

The traveling direction determination unit 235 determines the traveling direction of the own vehicle 1A based on the steering angle information and the shift position information.

The obstacle determination unit 237 sets the detection range 300 as a predetermined range around the own vehicle 1A. If the object detected based on the sensor data is positioned inside the detection range 300, the obstacle determination unit 237 determines the object as an obstacle that obstructs the traveling of the own vehicle 1A. If the obstacle determination unit 237 determines the object as the obstacle, the obstacle determination unit 237 outputs a control signal for stopping the traveling of the own vehicle 1A or decelerating the own vehicle 1A.

The obstacle determination unit 237 changes the detection range 300 based on a determination result of the traveling direction determination unit 235.

When the detection range 300 is changed based on the traveling direction of the own vehicle 1A, the detection range 300 in an area where the probability that there exists an obstacle that obstructs the traveling of the own vehicle 1A is low, for example, can be set to a position close to the own vehicle 1A so that the obstacle can be prevented from being erroneously detected. This makes it possible to prevent the obstacle from being erroneously determined in a vehicle area where there is little risk of contact and collision and prevent a brake from being erroneously operated.

The obstacle determination unit 237 makes the detection range 300 in a direction not corresponding to the traveling direction of the own vehicle 1A smaller than the detection range 300 in a direction corresponding to the traveling direction using the determination result of the traveling direction determination unit 235.

Therefore, when the detection range 300 in the area where the probability that there exists an obstacle that obstructs the traveling of the own vehicle 1A is low is set to the position close to the own vehicle 1A, the obstacle can be prevented from being erroneously detected.

If the traveling direction determination unit 235 determines that the traveling direction of the own vehicle 1A is a forward traveling direction, the obstacle determination unit 237 changes the detection range 300 behind the own vehicle 1A to be smaller than a set distance.

Therefore, if the traveling direction of the own vehicle 1A is a forward traveling direction, the obstacle determination unit 237 changes the detection range 300 behind the own vehicle 1A to be smaller than the set distance so that the obstacle can be prevented from being erroneously detected.

If the traveling direction determination unit 235 determines that the traveling direction of the own vehicle 1A is a backward traveling direction, the obstacle determination unit 237 changes the detection range 300 in front of the own vehicle 1A to be smaller than a set distance.

Therefore, if the traveling direction of the own vehicle 1A is a backward traveling direction, the obstacle determination unit 237 changes the detection range 300 in front of the own vehicle 1A to be smaller than the set distance so that the obstacle can be prevented from being erroneously detected.

If the traveling direction determination unit 235 determines that the traveling direction of the own vehicle 1A is a backward left turning direction, the obstacle determination unit 237 changes the detection range 300 in front of and on the left side of the own vehicle 1A to be smaller than a set distance.

Therefore, if the traveling direction of the own vehicle 1A is a backward left turning direction, the detection range 300 in front of and on the left side of the own vehicle 1A is changed to be smaller than the set distance so that the obstacle can be prevented from being erroneously detected.

If the traveling direction determination unit 235 determines that the traveling direction of the own vehicle 1A is a right turning direction, the obstacle determination unit 237 changes the detection range 300 in front of and on the right side of the own vehicle 1A to be smaller than a set distance.

Therefore, if the traveling direction of the own vehicle 1A is a right turning direction, the detection range 300 in front of and on the right side of the own vehicle 1A is changed to be smaller than the set distance so that the obstacle can be prevented from being erroneously detected.

The traveling direction determination unit 235 determines that the traveling direction of the own vehicle 1A is a backward left turning direction when the shift position represented by the shift position information is a backward position and the steering angle represented by the steering angle information is more than a first threshold value. The traveling direction determination unit 235 determines that the traveling direction of the own vehicle 1A is a backward right turning direction when the shift position represented by the shift position information is a backward position and the steering angle represented by the steering angle information is more than a second threshold value.

The first threshold value is set to a value within a range of not less than −120° nor more than −180°, and the second threshold value is set to a value within a range of not less than 120° nor more than 180°.

Therefore, the backward left turning and the backward right turning of the own vehicle 1A can be detected with high accuracy.

The above-described embodiment is merely an illustration of one aspect of the present invention, and variations and applications are optionally possible without departing from the scope and spirit of the invention.

For example, the path generation device 50 and the obstacle detection device 200 may be respectively composed of separate computer devices, as illustrated in FIG. 1, or may be composed of one computer device.

A block diagram illustrating a configuration of the obstacle detection device 200 illustrated in FIG. 1 is a schematic view illustrated by classifying components depending on a main processing content to facilitate understanding of the present invention, and the components can also be classified into more components depending on a processing content. The components can also be classified such that one of the components performs more processes.

If an obstacle detection method according to the present invention is implemented using a computer, a program that the computer is caused to execute can also be configured in a form of a recording medium or a transmission medium that transmits the program. A magnetic or optical recording medium or a semiconductor memory device can be used for the recording medium. Specific examples include portable or fixed recording media such as a flexible disk, an HDD, a CD-ROM (compact disk read only memory), a DVD, a Blue-ray (registered trademark) Disc, a magnetooptical disk, a flash memory, and a card-type recording medium. The above-described recording medium may be a non-volatile storage device such as a ROM or an HDD included in the path generation device 50.

Processing units in the flowchart illustrated in FIG. 12 are obtained by dividing the processing units of the flowchart depending on a main processing content to facilitate understanding of the processing of the obstacle detection device 200. The present invention is not limited depending on a method of dividing the process of the obstacle detection device 200 and the name of the divided process. The processing of the obstacle detection device 200 may be divided into more processing units depending on the processing content. The processing of the obstacle detection device 200 may be divided such that one of the processing units includes more processes.

REFERENCE SIGNS LIST

1A Vehicle
1B Another vehicle
3 In-vehicle apparatus
5 Communication bus
10 Position detection unit
20 Fixed detection range
30 Sonar unit
50 Path generation device
60, 110 Input/output I/F
70, 220 Memory
80, 230 Processor
81 Map generation unit
83 Parking path generation unit
85 Operation information generation unit
100 Operation control device
150 Traveling driving device
151 Steering device
153 Driving device
155 Braking device
157 Transmission device
200 Obstacle detection device
231 Manipulation information acquisition unit
233 Detection information acquisition unit
235 Traveling direction determination unit
237 Obstacle determination unit
300, 300A, 300B, 300C, 300D Detection range

What is claimed is:

1. An obstacle detection device comprising:
an input interface connected to an external device; and
a processor,
wherein the processor includes
a manipulation information acquisition unit configured to acquire steering angle information of a vehicle and shift position information of a shift device via the input interface;
a detection information acquisition unit configured to detect an object by a plurality of sensors arranged in a front, rear, and side part of the vehicle and acquire detection information of the object existing around the vehicle via the input interface;
a traveling direction determination unit configured to determine a traveling direction of the vehicle based on the steering angle information and the shift position information;
a path generation unit configured to generate a path in which the vehicle moves from a current position to a target position;
an operation information generation unit configured to generate operation information for traveling the vehicle based on information of the path generated by the path generation unit; and
an obstacle determination unit configured to set a detection range as a predetermined range around the vehicle, determines, when an object detected based on the detection information is positioned inside the detection range, the object as an obstacle that obstructs traveling of the vehicle, and outputs a control signal for stopping the traveling of the vehicle or decelerating the vehicle,
wherein the obstacle determination unit sets determination points in a predetermined distance on the path generated by the path generation unit, and when determining that the vehicle traveling along the generated path travels each of the set determination points, the obstacle determination unit changes the detection range based on a determination result of the traveling direction determination unit, when the traveling direction determination unit determines that the traveling direction of the vehicle is a backward left turning direction, the obstacle determination unit changes the detection range of at least one of the plurality of sensors arranged in front of and on the left side of the vehicle to be smaller than the detection range of the plurality of sensors arranged on the rear side of and the right side of the vehicle, and when the traveling direction determination unit determines that the traveling direction of the vehicle is a right turning direction, the obstacle determination unit changes the detection range of at least one of the plurality of sensors arranged in front of and on the right side of the vehicle to be smaller than the detection range of the plurality of sensors arranged on the rear side of and the left side of the vehicle.

2. The obstacle detection device according to claim 1, wherein the obstacle determination unit makes the detection range as a range not corresponding to the traveling direction of the vehicle smaller than the detection range as a range corresponding to the traveling direction using the determination result of the traveling direction determination unit.

3. The obstacle detection device according to claim 1, wherein the obstacle determination unit changes the detection range behind the vehicle to be smaller than the detection range in front of the vehicle when the traveling direction determination unit determines that the traveling direction of the vehicle is a forward traveling direction.

4. The obstacle detection device according to claim 1, wherein the obstacle determination unit changes the detection range in front of the vehicle to be smaller than the detection range behind the vehicle when the traveling direction determination unit determines that the traveling direction of the vehicle is a backward traveling direction.

5. The obstacle detection device according to claim 1, wherein the traveling direction determination unit determines that the traveling direction of the vehicle is a backward left turning direction when a shift position represented by the shift position information is a backward position and a steering angle represented by the steering angle information is more than a first threshold value, and determines that the traveling direction of the vehicle is a backward right turning direction when the shift position represented by the shift position information is a backward position and the steering angle represented by the steering angle information is more than a second threshold value, the first threshold value being set to a value within a range of not less than −120° nor more than −180°, and the second threshold value being set to a value within a range of not less than 120° nor more than 180°.

6. An obstacle detection method comprising:

an information acquisition step of acquiring steering angle information of a vehicle and shift position information of a shift device;

a detection information acquisition step of detecting an object by a plurality of sensors arranged in a front, rear, and side part of the vehicle and acquiring detection information of the object existing around the vehicle;

a traveling direction determination step of determining a traveling direction of the vehicle based on the steering angle information and the shift position information that are acquired;

a path generation step of generating a path in which the vehicle moves from a current position to a target position;

an operation information generation step of generating operation information for traveling the vehicle based on information of the path generated by the path generation unit;

an obstacle determination step of setting a detection range as a predetermined range around the vehicle and determining, when an object detected based on the detection information is positioned inside the detection range, the object as an obstacle that obstructs traveling of the vehicle; and an output step of outputting a control signal for stopping the traveling of the vehicle or decelerating the vehicle when the object is determined as the obstacle, wherein the obstacle determination step includes setting determination points in a predetermined distance on the path generated by the path generation unit, and when determining that the vehicle traveling along the generated path travels each of the set determination points, changing the detection range based on a determination result of the direction determination step, when the traveling direction determination step includes determining that the traveling direction of the vehicle is a backward left turning direction, the obstacle determination step includes changing the detection range of at least one of the plurality of sensors arranged in front of and on the left side of the vehicle to be smaller than the detection range of the plurality of sensors arranged on the rear side of and the right side of the vehicle, and when the traveling direction determination step includes determining that the traveling direction of the vehicle is a right turning direction, the obstacle determination step includes changing the detection range of at least one of the plurality of sensors arranged in front of and on the right side of the vehicle to be smaller than the detection range of the plurality of sensors arranged on the rear side of and the left side of the vehicle.

* * * * *